US010275536B2

(12) United States Patent
Gossweiler, III et al.

(10) Patent No.: US 10,275,536 B2
(45) Date of Patent: Apr. 30, 2019

(54) SYSTEMS, METHODS, AND COMPUTER-READABLE MEDIA FOR DISPLAYING CONTENT

(71) Applicant: Google LLC, Mountain View, CA (US)

(72) Inventors: Richard Carl Gossweiler, III, Sunnyvale, CA (US); Kenneth Wayne Dauber, Palo Alto, CA (US); Krishna Bharat, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 131 days.

(21) Appl. No.: 15/307,572

(22) PCT Filed: May 1, 2015

(86) PCT No.: PCT/US2015/028830
§ 371 (c)(1),
(2) Date: Oct. 28, 2016

(87) PCT Pub. No.: WO2015/168583
PCT Pub. Date: Nov. 5, 2015

(65) Prior Publication Data
US 2017/0124204 A1 May 4, 2017

Related U.S. Application Data

(60) Provisional application No. 61/987,335, filed on May 1, 2014.

(51) Int. Cl.
*G06F 17/30* (2006.01)
*G06F 3/01* (2006.01)

(52) U.S. Cl.
CPC ........ *G06F 17/30867* (2013.01); *G06F 3/017* (2013.01); *G06F 17/30554* (2013.01); *G06F 17/30864* (2013.01); *G06F 17/30873* (2013.01)

(58) Field of Classification Search
None
See application file for complete search history.

(56) References Cited

U.S. PATENT DOCUMENTS

2010/0205190 A1* 8/2010 Morris .................... G06F 3/041
707/758

OTHER PUBLICATIONS

Office Action issued in European Application No. 15726422.7, dated Feb. 16, 2018, 8 pages.
(Continued)

*Primary Examiner* — Belix M Ortiz Ditren
(74) *Attorney, Agent, or Firm* — Fish & Richardson P.C.

(57) ABSTRACT

Systems, methods, and computer-readable media are provided for displaying content. In accordance with one implementation, a computer-implemented method is provided that comprises operations performed by one or more processors, including receiving a first query from a first user, displaying a first set of content based on the first query in a first region of a graphical display, the first region being associated with a physical location of the first user, receiving a second query from a second user, and displaying a second set of content based on the second query in a second area of the graphical display, the second region being associated with a physical location of the second user. The method also comprises displaying a third set of content relating to the first query and the second query in a third region of the graphical display that is viewable by the first user and the second user.

30 Claims, 7 Drawing Sheets

(56) References Cited

OTHER PUBLICATIONS

International Search Report dated Jul. 15, 2015, in International Application No. PCT/US2015/028830 (2 pgs.).
Meredith Morris et al, "SearchTogether: An Interface for Collaborative Web Search", Proceedings of the 20$^{th}$ Annuarl ACM Symposium on User Interface Software and Technology, Oct. 7, 2007 (Oct. 7, 2007), pp. 3-12.
Written Opinion of the International Searching Authority in International Application No. PCT/US2015/028830 (8 pgs.).

* cited by examiner

USER A 120    USER B 122

SYSTEMS, METHODS, AND COMPUTER-READABLE MEDIA FOR DISPLAYING CONTENT

This application claims priority to U.S. Provisional Patent Application No. 61/987,335, filed on May 1, 2014, the entire contents of which are incorporated herein by reference.

BACKGROUND

The present disclosure relates generally to computerized systems and methods for displaying content to users. More particularly, and without limitation, the present disclosure relates to systems, methods, and computer-readable media for displaying content based on multiple user interests.

It is often desirable to enable users to view and interact with content presented on a display. For example, many devices present selectable objects and text query boxes that can receive user input and display content in response to the user input. A device, such as a laptop or tablet, is used by one user and content, when displayed, is intended to be displayed to that single user.

Some devices permit multiple user interaction. For example, in some large display devices, one user may submit input to, and view content from, one region of a display, and another user may submit input to, and view content from, another region of a display.

SUMMARY

The present disclosure relates to embodiments for content display. Moreover, embodiments of the present disclosure include systems, methods, and computer-readable media that are capable of displaying content. As will be appreciated, embodiments of the present disclosure may be implemented with any combination of hardware, software, and/or firmware, including computerized systems and methods embodied with processors or processing components.

In some embodiments consistent with the present disclosure, a computer-implemented system is provided for displaying content. The system includes a memory device that stores a set of instructions and at least one processor. The at least one processor executes the instructions to receive a first query from a first user and display a first set of content based on the first query in a first region of a graphical display, the first region being associated with a physical location of the first user. The at least one processor also executes the instructions to receive a second query from a second user and display a second set of content based on the second query in a second area of the graphical display, the second region being associated with a physical location of the second user. The at least one processor also executes the instructions to display a third set of content relating to the first query and the second query in a third region of the graphical display that is viewable by the first user and the second user.

In some embodiments consistent with the present disclosure, a method is provided for displaying content. The method includes receiving a first query from a first user and displaying a first set of content based on the first query in a first region of a graphical display, the first region being associated with a physical location of the first user. The method also includes receiving a second query from a second user and displaying a second set of content based on the second query in a second area of the graphical display, the second region being associated with a physical location of the second user. The method also includes displaying a third set of content relating to the first query and the second query in a third region of the graphical display that is viewable by the first user and the second user.

In some embodiments consistent with the present disclosure, a non-transitory computer-readable medium storing instructions is provided. The instructions, when executed by at least one processor, cause the at least one processor to perform operations including receiving a first query from a first user, displaying a first set of content based on the first query in a first region of a graphical display, the first region being associated with a physical location of the first user, receiving a second query from a second user, displaying a second set of content based on the second query in a second area of the graphical display, the second region being associated with a physical location of the second user, and displaying a third set of content relating to the first query and the second query in a third region of the graphical display that is viewable by the first user and the second user.

Additional aspects and embodiments consistent with the present disclosure will be set forth in part in the description which follows, and in part will be obvious from the description, or may be learned by practice of embodiments of the present disclosure, as claimed.

It is to be understood that both the foregoing general description and the following detailed description are explanatory only and are not restrictive of the claimed subject matter.

BRIEF DESCRIPTION OF THE DRAWINGS

The accompanying drawings, which are incorporated in and constitute part of this specification, and together with the description, illustrate and serve to explain the principles of various example embodiments.

DETAILED DESCRIPTION OF EXAMPLE EMBODIMENTS

Reference will now be made in detail to the example embodiments of the present disclosure, examples of which are illustrated in the accompanying drawings. Wherever possible, the same reference numbers will be used throughout the drawings to refer to the same or like parts.

Figure 1:
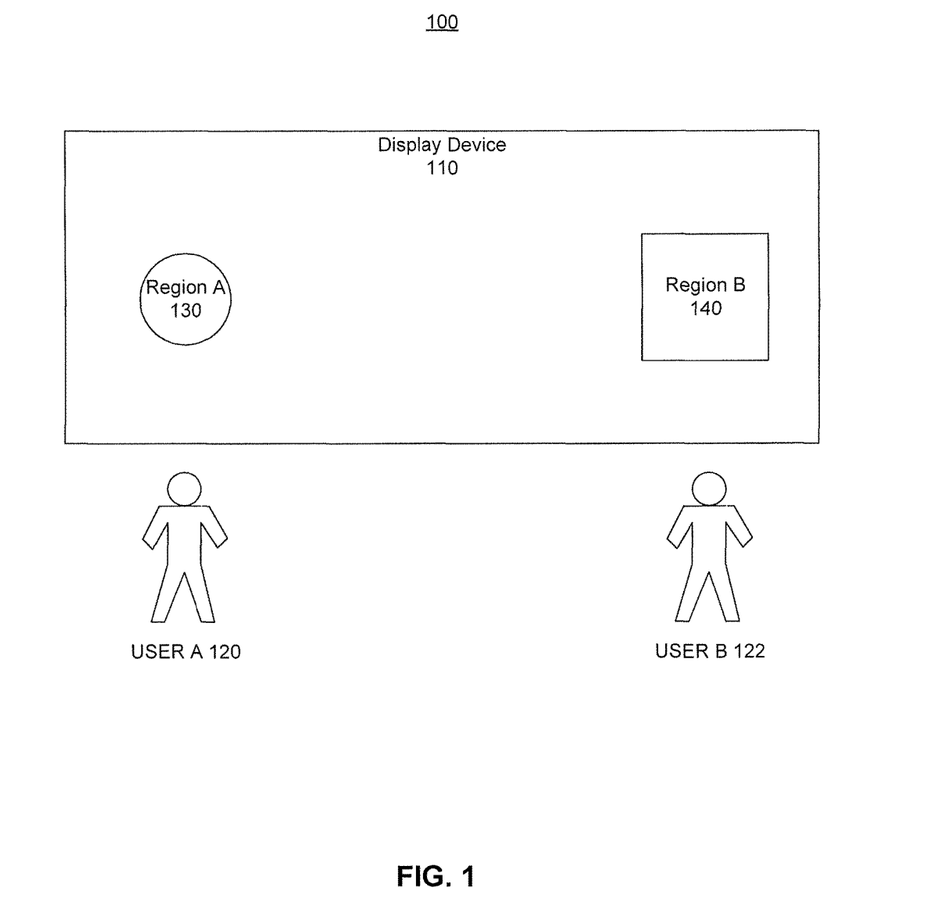
FIG. 1 illustrates an example implementation of embodiments and features of the present disclosure.

Systems, methods, and computer-readable media are disclosed that are capable of permitting multiple users to interact with a device displaying content. The device may include a display configured to present, for example, a first set of content in a first region associated with a first user and a second set of content in a second region associated with a second user (e.g., as shown in FIG. 1 and described in more detail below). For example, the device may transmit one or more queries from one or more users to a server, and may present content responsive to the queries on the display.

In some embodiments, the experience of a user may be influenced by the device interactions of another user. For example, if multiple users submit queries to the device, the device may be configured to present content that is responsive to individual queries or a combination of the queries. For example, content that relates to queries submitted by two different users may be displayed at a location viewable by both of the users.

Figure 2:
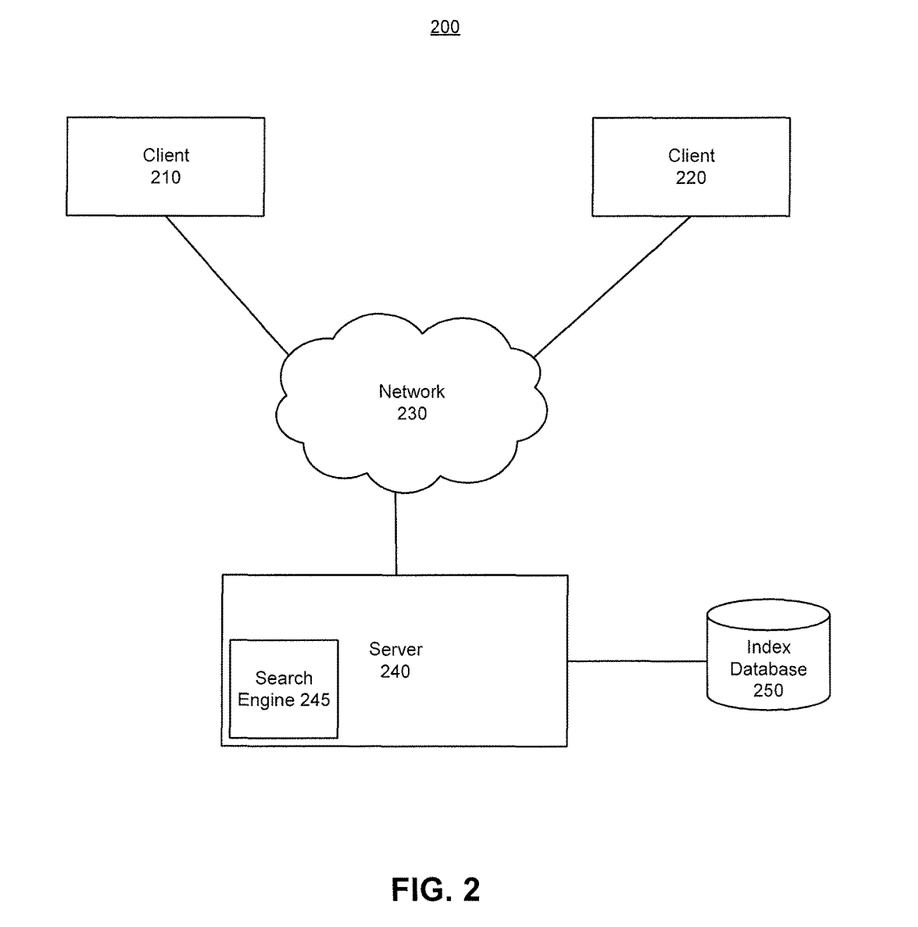
FIG. 2 illustrates an example system environment for implementing embodiments and features of the present disclosure.

FIG. 2 is a block diagram of an example system environment 200 for implementing embodiments and features of the present disclosure. The arrangement and number of components in system 200 is provided for purposes of illustration. Additional arrangements, number of components, and other modifications may be made, consistent with the present disclosure.

As shown in FIG. 2, system environment 200 may include one or more clients 210, 220. By way of example, clients 210, 220 may include smartphones, tablets, netbooks, electronic readers, personal digital assistants, personal computers, laptop computers, desktop computers, large display devices, and/or other types of electronics or communication devices. In some embodiments, clients 210, 220 are implemented with hardware devices and/or software applications running thereon. In certain embodiments, client 210 or 220 may implement embodiments and features of the present disclosure without the need for accessing another device, component, or network, such as network 230. In other embodiments server 240 may implement embodiments and features of the present disclosure without the need for accessing another device, component, or network 230. In yet other embodiments, clients 210, 220 may be configured to communicate to and/or through network 230 with other clients and components, such as server 240 and index database 250, and vice-versa.

In certain embodiments, network 230 may include any combination of communications networks. For example, network 230 may include the Internet and/or any type of wide area network, an intranet, a metropolitan area network, a local area network (LAN), a wireless network, a cellular communications network, etc.

Server 240 may include one or more servers configured to communicate and interact with clients 210, 220 and index database 250. In some embodiments, server 240 may implement or provide one or more search engines 245. Server 240 may be a general-purpose computer, a mainframe computer, or any combination of these components. In certain embodiments, server 240 may be standalone computing system or apparatus, or it may be part of a subsystem, which may be part of a larger system. For example, server 240 may represent distributed servers that are remotely located and communicate over a communications medium (e.g., network 230) or over a dedicated network, for example, a LAN. Server 240 may be implemented, for example, as a server, a server system comprising a plurality of servers, or a server farm comprising a load balancing system and a plurality of servers.

Index database 250 may include one or more logically and/or physically separate databases configured to store data. The data stored in index database 250 may be received from servers 240, from clients 210, 220 and/or may be provided as input using conventional methods (e.g., data entry, data transfer, data uploading, etc.). The data stored in the index database 250 may take or represent various forms including, but not limited to, documents, presentations, textual content, mapping and geographic information, rating and review information, pricing information, days and hours of operation information, news, audio files, video files, user profile information, and a variety of other electronic data, or any combination thereof.

In some embodiments, index database 250 may be implemented using a single computer-readable storage medium. In other embodiments, index database 250 may be maintained in a network attached storage device, in a storage area network, or combinations thereof, etc. Furthermore, index database 250 may be maintained and queried using numerous types of database software and programming languages, for example, SQL, MySQL, IBM DB2®, Microsoft Access®, PERL, C/C++, Java®, etc. Although FIG. 2 shows index database 250 associated with server 240, index database 250 may be a standalone database that is accessible via network 230 or index database 250 may be associated with or provided as part of a system or environment that may be accessible to clients 210, 220 and/or other components.

In some embodiments, a user can submit a query to a search engine 245 within server 240. When the user submits a query, the query may be transmitted through network 230 to server 240. Server 240 may include, or may be connected to index database 250 and search engine 245. Server 240 may respond to the query by generating search results, which are transmitted through network 230 to client 210, 220 in a form that can be presented to the user (e.g., a search results web page to be displayed in a web browser running on client 210, 220).

In some embodiments, when the query is received by search engine 245, search engine 245 identifies resources that match the query. Search engine 245 may also identify a particular "snippet" or section of each resource that is relevant to the query (or of the highest ranked resources that are relevant to the query). Search engine 245 may include an indexing engine that indexes resources (e.g., web pages, images, or news articles on the Internet) found in a corpus (e.g., a collection or repository of content), an index database that stores the index information, and a ranking engine (or other software) to rank the resources that match the query. The indexing engine can index information using traditional techniques.

The ranking engine generally has access to one or more scoring functions that are, for example, associated with the ranking engine. The ranking engine selects a scoring function from the set of scoring functions. The ranking engine can base the selection on user input. Alternatively, the ranking engine can select a scoring function based on instructions received from a scoring functions evaluator. In some implementations, the ranking engine can select multiple scoring functions and send multiple sets of ranked search results, one corresponding to each selected scoring function, to client 210, 220.

In some embodiments, the ranking engine ranks search results that are responsive to the query by determining one or more signals for the search result and the query, sending those signals to one of the scoring functions, receiving a score from the scoring function for each search result, and then ranking the search results based on the received scores. The ranking engine and scoring functions can communicate according to commands specified in an application programming interface (API). In general, the API specifies interfaces used by the ranking engine and the scoring function to implement and invoke a series of commands for sharing data. For example, the API can specify a command used by a scoring function to receive scoring data from the ranking engine, or can specify a command used by a ranking engine to request a score from a scoring function. In some implementations, data is passed between the scoring function and the ranking engine in messages encoded according to a messaging format. The messaging format can be specified by the API, or can be separate from the API.

Examples of signals include information about the query itself, for example, the terms of the query, an identifier of the user who submitted the query, and a categorization of the user who submitted the query (e.g., the geographic location from where the query was submitted, the language of the user who submitted the query, interests of the user who submitted the query, or a type of client 210, 220 used to submit the query (e.g., mobile device, laptop, desktop)). The identification of the user can be, for example, a user name or the IP address of client 210, 220. The geographic location from where the query was submitted can be, for example, a continent, a country, a state, a city, or geographic coordinates, such as latitude and longitude.

Signals can also include information about the terms of the query, for example, the locations where a query term appears in the title, body, and text of anchors in a search result, where a query term appears in anchors pointing to the search result, how a term is used in the search result (e.g., in the title of the search result, in the body of the search result, or in a link in the search result), the term frequency (i.e., the number of times the term appears in a corpus of documents in the same language as the query divided by the total number of terms in the corpus), and the document frequency (i.e., the number of documents in a corpus of documents that contain the query term divided by the total number of documents in the corpus).

Further examples of signals include information about the search result, for example, a measure of the quality of the search result, the URL of the search result, the geographic location where the search result is hosted, when server 240 first added the search result to index database 250, the language of the search result, the size of the search result (e.g., number of tokens or file size), the length of the title of the search result, and the length of the text of source anchors for links pointing to the document.

Other examples of signals include information about anchor text for links pointing to the search result, for example, the text itself and the total number of tokens (e.g., words) in the anchor text. For example, if an anchor pointing to the search result has the text "NY" and another anchor has the text "New York," then the signals can include the text "NY" and "New York" as well as the number of tokens in the text: one from "NY" and two from "New York" for a total of three tokens. Other anchor signals for links pointing to the search result include the number of documents in the domain of the search result that have a link pointing to the search result with given anchor text, and the number of documents from different domains than the search result that have a link pointing to the search result with given anchor text.

The ranking engine may also provide additional information to the scoring function, for example, scoring parameters. In some implementations, server 240 receives the scoring parameters with the query.

Figure 3:
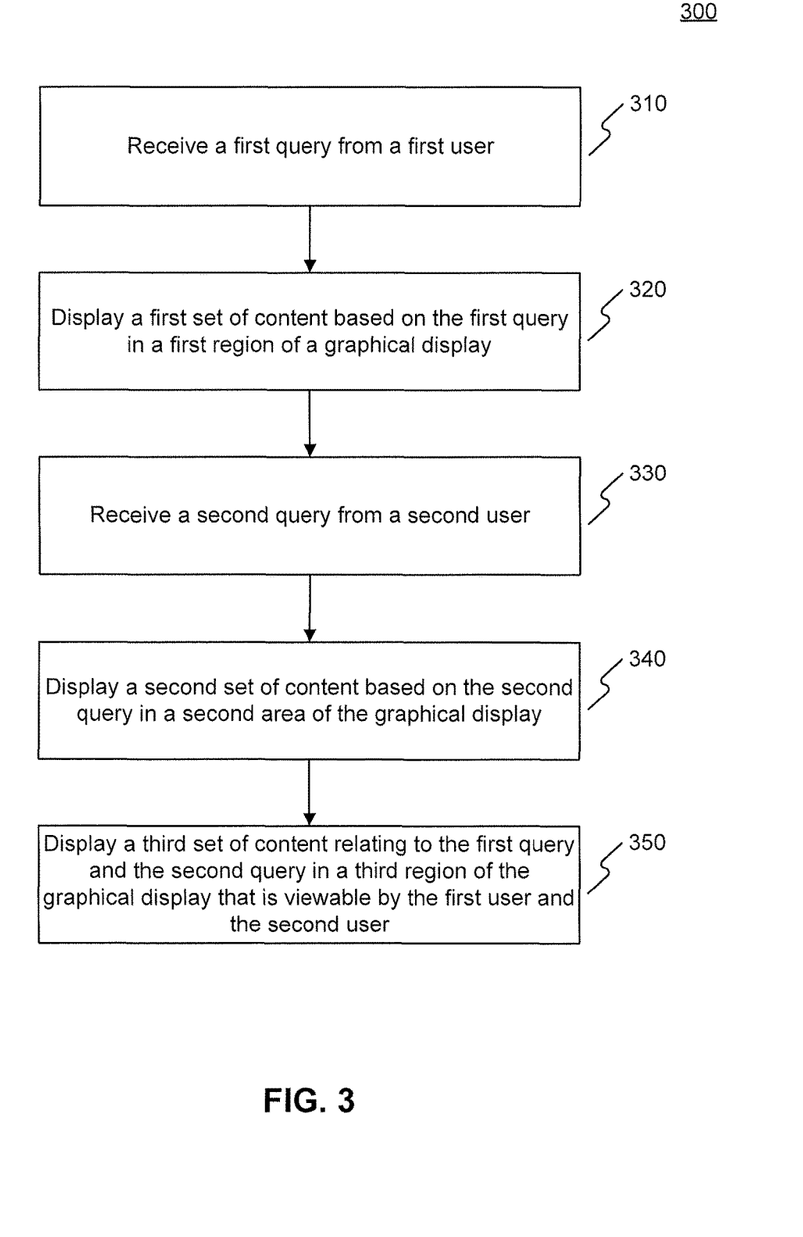
FIG. 3 illustrates an example method for displaying content.

FIG. 3 depicts a flowchart of an example method 300, consistent with some embodiments of the present disclosure. Method 300 may be implemented for displaying and/or otherwise presenting content. As used herein, "content" may include, for example, text data, audio data, image data, video data, and the like. By way of example, such content may correspond to news, stories, blog posts, products, services, music, movies, multimedia, presentations, tours, guides, advertisements, and any other type of information.

In some embodiments, method 300 may be implemented as one or more computer programs executed by a processor. Moreover, in some embodiments, method 300 may be implemented by a server (e.g., server 240 having one or more processors executing one or more computer programs stored on a non-transitory computer readable medium), a client (e.g., client 210, 220 having one or more processors executing one or more computer programs stored on a non-transitory computer readable medium), or by a combination of a client and a server.

In some embodiments, example method 300 begins by receiving a first query from a first user (step 310). A query may include any user input. For example, a query may include a text input received from a physical or virtual keyboard, an audio input received from a microphone, image data received from a camera, proximity data received from a touch screen display device, etc. As one example of a query, a user may enter text representative of a request for data regarding the text. As another example of a query, a microphone may record voice data representative of a request for data. As another example of a query, a camera may capture image data of a user gesturing toward an image presented on a display, wherein the gesture is representative of a query for data regarding the image. As another example of a query, a touch screen display device may receive information associated with a user touching an image presented on the touch screen display, wherein the touch is representative of a query for data regarding the image.

Figure 7:
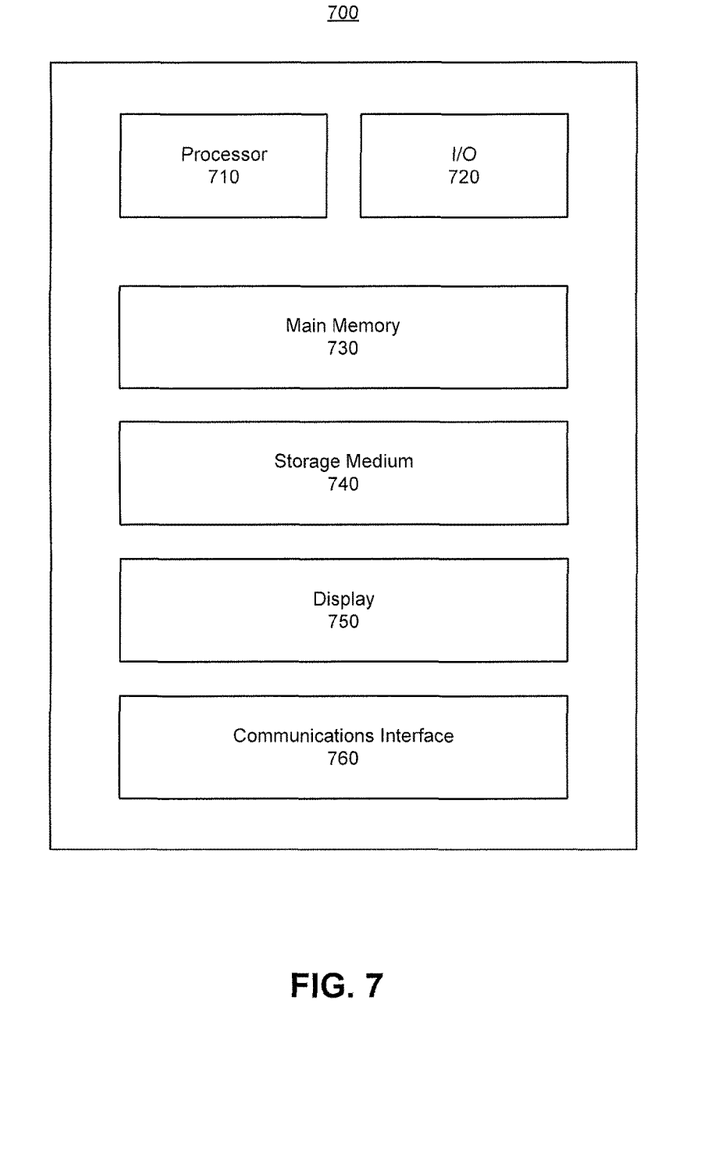
FIG. 7 illustrates an example electronic apparatus or system for implementing embodiments and features of the present disclosure.

The first query may be received, for example, at a client 210, 220. A first user and a second user may both interact with, for example, client 210. FIG. 2 depicts an example implementation in which client 210 is a display device 110. Display device 110 may be configured, for example, in the manner described above with respect to apparatus or system 700, and may include, for example, one or more displays 750.

As shown in FIG. 1 a first user (e.g., user A 120) may stand next to display device 110 at a first location and a second user (e.g., user B 122) may stand next to display device 110 at a second location different from the first location. For example, in the example shown in FIG. 1, user A 120 is standing near a left portion of display device 110 and user B 122 is standing near a right portion of display device 110. However, FIG. 1 is an example only, and user A 120 and user B 122 may stand anywhere relative to display device 110. Moreover, display device 110 may be oriented in a variety of different manners. For example, display device 110 may be front-facing (e.g., mounted to a wall, projected onto a wall, or upright on a stand), up-facing (e.g., flat on a table), or oriented in any other direction.

In some embodiments, a first region of display device 110 is determined (e.g., by processor 710) based on the first position of the first user. For example, as shown in FIG. 1, user A 120 may be associated with region A 130. Region A 130 may be determined, for example, based on image data received from a camera (not shown). For example, the camera may capture an image of an area associated with display device 110 (e.g., all areas within 10 feet of display device 110). The camera may send the image data to a processor (e.g., processor 710) associated with display device 110, which may determine the presence and location of user A 120. Based on the location of user A 120, the processor associated with display device 110 may associate region A 130 of display device 110 to user A 120. For example, region A 130 may be selected as a region on display device 110 that is perpendicular to a face of user A 120.

Region A 130 and region B 140 may be any shape and size. In some embodiments, region A 130 and region B 140 are predetermined shapes and sizes. For example, region A 130 may include the left third of display device 110 and region B 140 may include the right third of display device 110. As another example, region A 130 and region B 140 may be determined based on the shape and position of user A 120 and user B 122.

In some embodiments, an initial display is presented in region A 130 and region B 140. For example, the initial display may include a dialog box permitting a user to enter text (e.g., using a keyboard), a selectable image (e.g., an image that may be selected with a gesture captured by a camera or a touch screen display device), or any other information that may, for example, prompt a user to input a query.

For example, if a dialog box is presented, a user may enter text for a query. Display device 110 may generate a query that includes data associated with the entered text and, optionally, other information (e.g., a location of display device 110, an identifier associated with user A 120, and/or a profile of user A 120). For example, display device 110 may be configured to determine a location (e.g., using a GPS device) or access location information (e.g., location information may be stored in memory of display device 110). Additionally, for example, display device 110 may require user A 120 to log in to a user account to determine, for example, a user ID and/or a user profile. As another example, user A 120 may be recognized using, for example, face recognition.

If an image is presented on display device 110 (which may, for example, be one of a plurality of images displayed on display device 110), a user may submit a query associated with the displayed image by gesturing to the image and/or selecting the image using a touch screen display device (which, in some embodiments, is part of display device 110). Display device 110 may generate a query that includes data associated with the selected image (e.g., an identifier associated with the selected image) and, optionally, other information (e.g., a location of display device 110, an identifier associated with user A 120, and/or a profile of user A 120) determined in the manner described above.

In some embodiments, the query is processed locally. For example, data may be stored on display device 110 that can respond to the query. In other embodiments, the query may be sent to, for example, server 240 via network 230. In still other embodiments, an attempt may be made to initially process the query locally, which if unsuccessful or insufficient, may result in the query being sent to server 240.

In some embodiments, example method 300 further includes displaying a first set of content based on the first query in a first region of a graphical display, the first region being associated with a physical location of the first user (step 320).

The first set of content may include, for example, any type of information or data determined based on any type of query. For example, the first set of content may include text data, audio data, image data, video data, and the like. For example, the first set of content may include text search results, audio search results, image search results, video search results, and the like. The first set of content may be received, for example, from server 240. For example, server 240 may determine a first set of data containing varying degrees of responsiveness to the query. For example, the first set of data may include a plurality of items of content, each ranked using, for example, the ranking engine described above. The first set of content may include a predetermined number of items from the first set of data (e.g., the single highest ranked item from the first set of data, or the ten highest ranked items from the first set of data).

As one example, if the query included data associated with the text "cheese," the spoken word "cheese," a gesture toward an image of cheese, or a touch screen selection of an image of cheese, then the first set of content may include additional text data, audio data, image data, and/or video data regarding cheese. Optionally, the first set of content may also relate to other information. For example, if display device 110 is located in a geographical region, and the query includes information identifying the geographical region, the first set of content may include information about cheese manufacturers within the geographical region. As another example, if server 240 has access to a user profile and determines that a user associated with a query has a certain characteristic (e.g., frequently purchases cheese), then the first set of content may include data that is also responsive to the certain characteristic (e.g., cheese stores may be included in the first set of content). The first set of content may be displayed, for example, in Region A 130.

In some embodiments, example method 300 further includes receiving a second query from a second user (step 330). The second query may be received from the second user in substantially the same manner as described above with respect to the first query being received from the first user. The second query may be received before the first query is received, at the same time as the first query, or after the first query is received.

In some embodiments, example method 300 further includes displaying a second set of content based on the second query in a second area of the graphical display, the second region being associated with a physical location of the second user (step 340). The second set of content may be displayed in substantially the same manner as described above with respect to the first set of content being displayed.

In some embodiments, example method 300 further includes displaying a third set of content relating to the first query and the second query in a third region of the graphical display that is viewable by the first user and the second user (step 350). The third set of content may include text data, audio data, image data, video data, and the like.

The third set of content may be determined in several different ways. For example, in some embodiments, when the first query and the second query are sent to server 240, the third set of content may be determined at server 240 based on the first query and the second query. For example, server 240 may determine a first set of data based on the first query, which may be the same as the first set of content or may be different than the first set of content (e.g., a superset from which the first set of content is selected). Likewise, server 240 may determine a second set of data based on the second query, which may be the same as the second set of content or may be different than the second set of content (e.g., a superset from which the second set of content is selected).

Server 240 may determine the third set of content by determining data that is in both the first set of data and the second set of data. For example, as discussed above, in some embodiments the first set of data may be ranked and the second set of data may be ranked. The third set of content may be selected by determining the highest ranked data that is present in both the first set of data and the second set of data. For example, server 240 may determine the highest ranking data in the first set of data that is also present in the second set of data. Conversely, server 240 may determine the highest ranking data in the second set of data that is also present in the first set of data. As another example, server 240 may determine data that has the highest average ranking in both the first set of data and the second set of data.

The third set of content is not necessarily chosen from data that is responsive to the first query and the second query. For example, the third set of content may relate to the first query and the second query by virtue of being related to any data associated with the first query and the second query. For example, in some embodiments, the third set of content may be determined from a third query generated based on information associated with the first query and information associated with the second query. The information associated with the first query and the second query may include information in the first query and the second query themselves, information relating to the device from which the queries were submitted (e.g., a location of the device), or information relating to the users that submitted the queries (e.g., information in a profile of the first user and a profile of the second user). For example, client 210 or server 240 may generate a third query containing data from the profile of the first user and data from the profile of the second user.

Moreover, in some embodiments, the third set of content may not be determined and/or presented automatically when the first query and the second query are made. For example, content responsive to the first query may be presented on a mobile device of user A 120 and/or content responsive to the second query may be presented on a mobile device of user B 122. The third set of content may be determined and/or presented based on an indication from user A 120 and/or user B 122 that the data can be shared publicly.

In some embodiments, the third region to display the third set of content may be determined based on the first position of the first user and the second position of the second user. For example, the third region may be selected as a central location between the first user and the second user. However, the third set of content may also be displayed at any other location. For example, the third set of content may be displayed at a predetermined location on a display.

Figure 4:
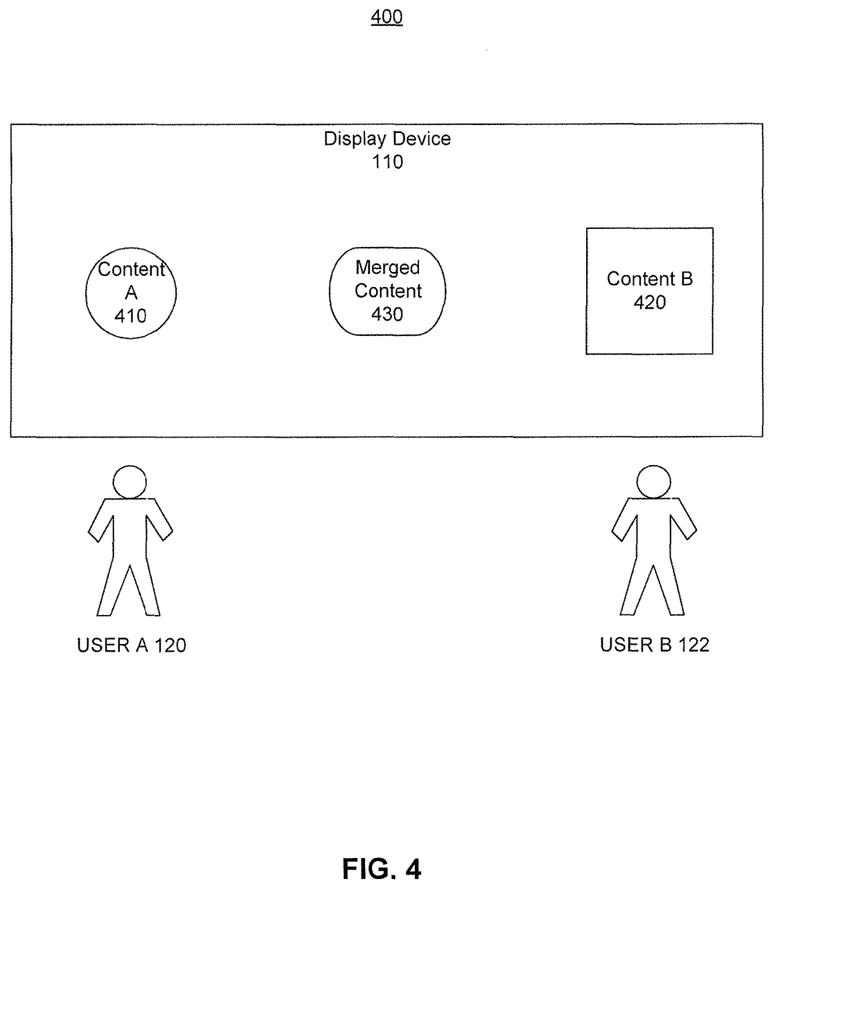
FIGS. 4-6 illustrate example implementations of embodiments and features of the present disclosure.

FIG. 4 depicts one example electronic apparatus or system environment 400 in which a third set of content is displayed, wherein merged content 430 may be representative of some or all of the third set of content. In some embodiments, content A 410 may be the same as the initial display presented in region A 130. In other embodiments, content A 410 may be associated with a query based on the initial display presented in region A 130. Content A 410 may be any text data, audio data, image data, and/or video data that is associated with one or more queries made by user A 120. Similarly, content B 420 may be the same as the initial display presented in region B 140. In other embodiments, content B 420 may be associated with a query based on the initial display presented in region B 140. Content B 420 may be any text data, audio data, image data, and/or video data that is associated with one or more queries made by user B 122.

In the example shown in FIG. 4, merged content 430 is displayed centered between content A 410 and content B 420. In some embodiments, the displayed third set of content includes an item that is more similar to the first set of content than the second set of content (or more similar to the second set of content than the first set of content). For example, the third set of content may be determined to be more similar to the first set of content than the second set of content if the third set of content is associated with a higher ranking in search results associated with the first set of content than in search results associated with the second set of content. In some embodiments, if an item in the third set of content is more similar to the first set of content than the second set of content, the item may be displayed at a location closer to the first set of content than the second set of content. Likewise, if an item in the third set of content is more similar to the second set of content than the first set of content, the item may be displayed at a location closer to the second set of content than the first set of content. Thus, in some embodiments items in the third set of content are displayed at locations determined based on their similarity to the first set of content and the second set of content.

Figure 5:
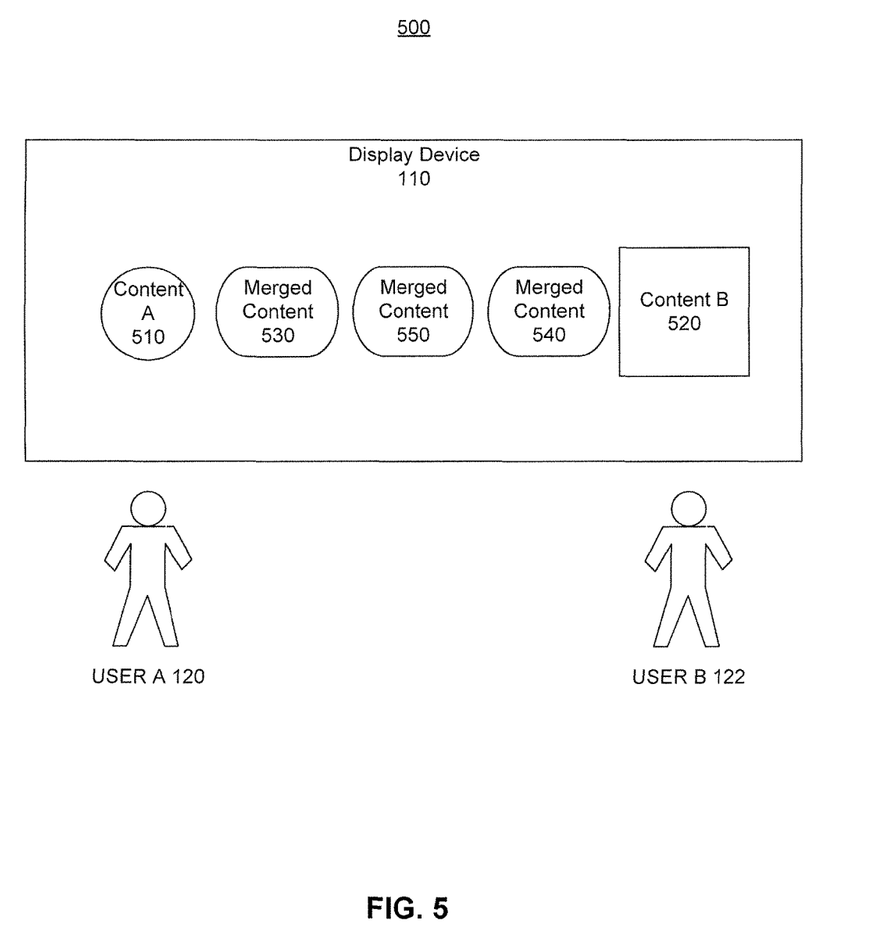

For illustrative purposes only, FIG. 4 depicts one block representative of merged content 430. In other embodiments, the third set of content may include a plurality of items. For example, FIG. 5 depicts an example in which merged content 530 (e.g., a first item in the third set of content) is more similar to content A 510 (e.g., an item in the first set of content) than content B 520 (e.g., an item in the second set of content); merged content 540 (e.g., a second item in the third set of content) is more similar to content B 520 than content A 510; and merged content 550 (e.g., a third item in the third set of content) is equally similar to content A 510 and content B 520. Therefore, in the example shown in FIG. 5, merged content 530 is displayed closer to content A 510 than content B 520, merged content 540 is displayed closer to content B 520 than content A 510, and merged content 550 is displayed centered between content A 510 and content B 520.

Figure 6:
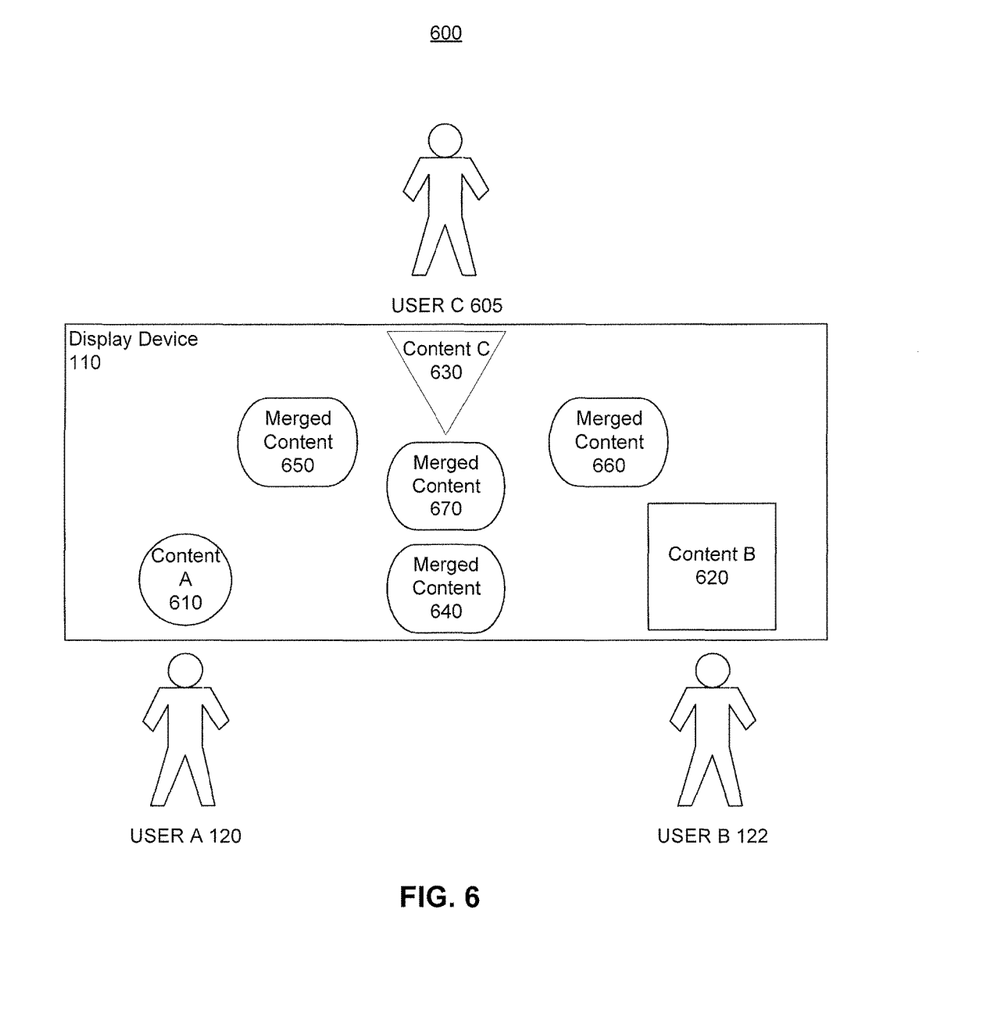

Moreover, while embodiments are described above in which two users interact with display device 110, in other embodiments other quantities of users may interact with display device 110. For example, FIG. 6 depicts a scenario in which three users interact with display device 110. In the example in FIG. 6, display device 110 may be, for example, lying flat facing upwards. User A 120 and user B 122 may, for example, be positioned at opposite ends of the same side of display device 110, while user C 605 may be positioned at a different side of display device 110. It will be appreciated that the users may be positioned at any location relative to display device 110, and the arrangement shown in FIG. 6 is an example only.

In the example shown in FIG. 6, merged content 650 (e.g., a first item in the third set of content) is more similar to content A 610 (e.g., an item in a set of content responsive to a query by user A 120) and content C 630 (e.g., an item in a set of content responsive to a query by user C 605) than content B 620 (e.g., an item in a set of content responsive to a query by user B 122); merged content 640 (e.g., a second item in the third set of content) is more similar to content A 610 and content B 620 than content C 630; merged content 660 (e.g., a third item in the third set of content) is more similar to content B 620 and content C 630 than content A 610; and merged content 670 is equally similar to content A 610, content B 620, and content C 630. Therefore, in the example shown in FIG. 7, merged content 650 is displayed closer to content A 610 and content C 630 than content B 620, merged content 640 is displayed closer to content A 610 and content B 620 than content C 630, merged content 660 is displayed closer to content B 620 and content C 630 than content A 610, and merged content 670 is displayed centered between content A 610, content B 620, and content C 630.

As discussed above, in some embodiments, merged content may be displayed on the same device as content associated with a first user and content associated with a second user. In other embodiments, the merged content may be displayed separately. For example, content A 410 may be presented on a mobile device of user A 120, content B 420 may be presented on a different mobile device of user B 122, and merged content 430 may be presented on display device 110. Merged content 430 may be presented on display device 110, for example, as user A 120 and/or user B 122 approach display device 110, or in response to an indication from user A 120 and/or user B 122 that data associated with content A 410 and/or content B 420 can be shared.

FIG. 7 is a block diagram of an example electronic apparatus or system 700 for implementing embodiments and features of the present disclosure. By way of example, apparatus or system 700 may be used to implement clients 210, 220, server 240, and/or index database 250 of FIG. 2. The arrangement and number of components in system 700 is provided for purposes of illustration. Additional arrangements, number of components, and other modifications may be made, consistent with the present disclosure.

As shown in FIG. 7, system 700 may include one or more processors 710 for executing instructions. Processors suitable for the execution of instructions include, by way of example, both general and special purpose microprocessors, and any one or more processors of any kind of digital computer. System 700 may also include one or more input/output (I/O) devices 720. By way of example, I/O devices 720 may include physical keyboards, virtual touch-screen keyboards, mice, joysticks, styluses, etc. In certain embodiments, system 700 may also be capable of receiving input through a microphone using, for example, voice recognition applications.

As further illustrated in FIG. 7, system 700 may include one or more storage devices configured to store data and/or software instructions used by the one or more processors 710 to perform operations consistent with disclosed embodiments. For example, system 700 may include main memory 730 configured to store one or more software programs that performs functions or operations when executed by the one or more processors 710. By way of example, main memory 730 may include NOR or NAND flash memory devices, Read Only Memory (ROM) devices, Random Access Memory (RAM) devices, etc. System 700 may also include storage medium 740. By way of example, storage medium 740 may include hard drives, solid state drives, tape drives, RAID arrays, etc. Although FIG. 7 shows only one main memory 730 and one storage medium 740, system 700 may include any number of main memories 730 and storage mediums 740. Further, although FIG. 7 shows main memory 730 and storage medium 740 as part of system 700, main memory 730 and/or storage medium 740 may be located remotely and system 700 may be able to access main memory 730 and/or storage medium 740 via network 230.

System 700 may also include one or more displays 750 for displaying data and information. Display 750 may be implemented using devices or technology, such as a cathode ray tube (CRT) display, a liquid crystal display (LCD), a plasma display, a light emitting diode (LED) display, a touch screen type display, and/or any other type of display.

System 700 may also include one or more communications interfaces 760. Communications interface 760 may allow software and data to be transferred between system 700, network 230, clients 210, 220, and/or other components. Examples of communications interface 760 may include a modem, a network interface (e.g., an Ethernet card), a communications port, a PCMCIA slot and card, etc. Communications interface 760 may transfer software and data in the form of signals, which may be electronic, electromagnetic, optical, or other signals capable of being received by communications interface 760. These signals may be provided to communications interface 760 via a communications path (not shown), which may be implemented using wire, cable, fiber optics, radio frequency ("RF") link, and/or other communications channels.

The disclosed embodiments are not limited to separate programs or computers configured to perform dedicated tasks. For example, server 240 may include main memory 730 that stores a single program or multiple programs. Additionally, server 240 may execute one or more programs located remotely from server 240. In some example embodiments, server 240 may be capable of accessing separate web server(s) or computing devices that generate, maintain, and provide web sites and/or event creation and notification services. Clients 210, 220 may function in a manner similar to server 240 and vice-versa.

Embodiments of the present disclosure include computer-implemented methods, tangible non-transitory computer-readable mediums, and computer-implemented systems. The computer-implemented methods may be executed, for example, by a processor that receives instructions from a non-transitory computer-readable storage medium. Similarly, systems consistent with the present disclosure may include at least one processor and memory, and the memory may be a non-transitory computer-readable storage medium.

As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, and any other known physical storage medium. Singular terms, such as "memory" and "computer-readable storage medium," may additionally refer to multiple structures, such a plurality of memories and/or computer-readable storage mediums.

As referred to herein, a "memory" may comprise any type of computer-readable storage medium unless otherwise specified. A computer-readable storage medium may store instructions for execution by a processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

While the present disclosure provides examples of one or more processes or apparatuses, it will be appreciated that other processes or apparatuses can be implemented or adopted to be within the scope of the accompanying claims.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system or existing communications software.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps and/or inserting or deleting steps. It is intended, therefore, that the specification and examples be considered as example only, with a true scope and spirit being indicated by the following claims and their full scope of equivalents.

What is claimed is:

1. A computer-implemented system for displaying content, comprising:
    a memory device that stores a set of instructions; and
    at least one processor that executes the instructions to:
        receive a first query from a first user;
        display a first set of content based on the first query in a first region of a graphical display, the first region being associated with a physical location of the first user, and the first set of content being a plurality of search results determined to be responsive to the first query;
        receive a second query from a second user;
        display a second set of content based on the second query in a second area of the graphical display, the second region being associated with a physical location of the second user, and the second set of content being a plurality of search results determined to be responsive to the second query;
        determining that the first set of content and the second set of content include one or more search results that are each present in both the first set of content and the second set of content, and in response:
            generating a third set of content relating to the first query and the second query by including in the third set of content the one or more search results that are each present in both the first set of content and the second set of content; and
            display the third set of content relating to the first query and the second query in a third region of the graphical display that is viewable by the first user and the second user.

2. The computer-implemented system according to claim 1, wherein the third set of content further relates to a location of the first user and a location of the second user.

3. The computer-implemented system according to claim 1, wherein the third set of content further relates to a profile of the first user and a profile of the second user.

4. The computer-implemented system according to claim 1, wherein the displayed third set of content includes an item that is more similar to the first set of content than the second set of content, and wherein the at least one processor further executes the instructions to display the item at a location closer to the first set of content than the second set of content.

5. The computer-implemented system according to claim 1, wherein the first user views the graphical display on a display device, and wherein the second user also views the graphical display on the display device.

6. The computer-implemented system according to claim 5, wherein the first user is located in a first position relative to the display device and the second user is located in a second position relative to the display device.

7. The computer-implemented system according to claim 6, wherein the at least one processor further executes the instructions to determine the first region based on the first position of the first user, and determine the second region to display the second set of content based on the second position of the second user.

8. The computer-implemented system according to claim 7, wherein the at least one processor further executes the instructions to determine the third region to display the third set of content based on the first position of the first user and the second position of the second user.

9. The computer-implemented system according to claim 1, further comprising at least one camera that is positioned to capture images of the first user and the second user.

10. The computer-implemented system according to claim 1, wherein the at least one processor further executes the instructions to:
    detect a first gesture associated with the first set of content performed by the first user;
    detect a second gesture associated with the second set of content performed by the second user;
    transmit, based on the detected first gesture and the detected second gesture, data associated with the first set of content and the second set of content to a server; and
    receive, from the server, the third set of content.

11. A method for displaying content, comprising the following operations performed by one or more processors:
    receiving a first query from a first user;
    displaying a first set of content based on the first query in a first region of a graphical display, the first region being associated with a physical location of the first user, and the first set of content being a plurality of search results determined to be responsive to the first query;
    receiving a second query from a second user;
    displaying a second set of content based on the second query in a second area of the graphical display, the second region being associated with a physical location of the second user, and the second set of content being a plurality of search results determined to be responsive to the second query;
    determining that the first set of content and the second set of content include one or more search results that are each present in both the first set of content and the second set of content, and in response:
        generating a third set of content relating to the first query and the second query by including in the third set of content the one or more search results that are each present in both the first set of content and the second set of content; and
        displaying the third set of content relating to the first query and the second query in a third region of the graphical display that is viewable by the first user and the second user.

12. The method according to claim 11, wherein the third set of content further relates to a location of the first user and a location of the second user.

13. The method according to claim 11, wherein the third set of content further relates to a profile of the first user and a profile of the second user.

14. The method according to claim 11, wherein the displayed third set of content includes an item that is more similar to the first set of content than the second set of content, and wherein the method further comprises displaying the item at a location closer to the first set of content than the second set of content.

15. The method according to claim 11, wherein the first user views the graphical display on a display device, and wherein the second user also views the graphical display on the display device.

16. The method according to claim 15, wherein the first user is located in a first position relative to the display device and the second user is located in a second position relative to the display device.

17. The method according to claim 16, further comprising:
 determining the first region based on the first position of the first user; and
 determining the second region to display the second set of content based on the second position of the second user.

18. The method according to claim 17, further comprising determining the third region to display the third set of content based on the first position of the first user and the second position of the second user.

19. The method according to claim 11, further comprising receiving, from at least one camera, images of the first user and the second user.

20. The method according to claim 11, further comprising:
 detecting a first gesture associated with the first set of content performed by the first user;
 detecting a second gesture associated with the second set of content performed by the second user;
 transmitting, based on the detected first gesture and the detected second gesture, data associated with the first set of content and the second set of content to a server; and
 receiving, from the server, the third set of content.

21. A non-transitory computer-readable medium comprising instructions that, when executed by at least one processor, cause the at least one processor to perform operations including:
 receiving a first query from a first user;
 displaying a first set of content based on the first query in a first region of a graphical display, the first region being associated with a physical location of the first user, and the first set of content being a plurality of search results determined to be responsive to the first query;
 receiving a second query from a second user;
 displaying a second set of content based on the second query in a second area of the graphical display, the second region being associated with a physical location of the second user, and the second set of content being a plurality of search results determined to be responsive to the second query;
 determining that the first set of content and the second set of content include one or more search results that are each present in both the first set of content and the second set of content, and in response:
  generating a third set of content relating to the first query and the second query by including in the third set of content the one or more search results that are each present in both the first set of content and the second set of content; and
  displaying the third set of content relating to the first query and the second query in a third region of the graphical display that is viewable by the first user and the second user.

22. The non-transitory computer-readable medium according to claim 21, wherein the third set of content further relates to a location of the first user and a location of the second user.

23. The non-transitory computer-readable medium according to claim 21, wherein the third set of content further relates to a profile of the first user and a profile of the second user.

24. The non-transitory computer-readable medium according to claim 21, wherein the displayed third set of content includes an item that is more similar to the first set of content than the second set of content, and wherein the instructions, when executed by the at least one processor, further cause the at least one processor to perform an operation including displaying the item at a location closer to the first set of content than the second set of content.

25. The non-transitory computer-readable medium according to claim 21, wherein the first user views the graphical display on a display device, and wherein the second user also views the graphical display on the display device.

26. The non-transitory computer-readable medium according to claim 25, wherein the first user is located in a first position relative to the display device and the second user is located in a second position relative to the display device.

27. The non-transitory computer-readable medium according to claim 26, wherein the instructions, when executed by the at least one processor, further cause the at least one processor to perform operations including:
 determining the first region based on the first position of the first user; and
 determining the second region to display the second set of content based on the second position of the second user.

28. The non-transitory computer-readable medium according to claim 27, wherein the instructions, when executed by the at least one processor, further cause the at least one processor to perform an operation including determining the third region to display the third set of content based on the first position of the first user and the second position of the second user.

29. The non-transitory computer-readable medium according to claim 21, wherein the instructions, when executed by the at least one processor, further cause the at least one processor to perform an operation including receiving, from a camera, images of the first user and the second user.

30. The non-transitory computer-readable medium according to claim 21, wherein the instructions, when executed by the at least one processor, further cause the at least one processor to perform operations including:
 detecting a first gesture associated with the first set of content performed by the first user;
 detecting a second gesture associated with the second set of content performed by the second user;
 transmitting, based on the detected first gesture and the detected second gesture, data associated with the first set of content and the second set of content to a server; and
 receiving, from the server, the third set of content.

* * * * *

UNITED STATES PATENT AND TRADEMARK OFFICE
CERTIFICATE OF CORRECTION

| | | |
|---|---|---|
| PATENT NO. | : 10,275,536 B2 | Page 1 of 1 |
| APPLICATION NO. | : 15/307572 | |
| DATED | : April 30, 2019 | |
| INVENTOR(S) | : Gossweiler, III et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 189 days.

Signed and Sealed this
Nineteenth Day of May, 2020

Andrei Iancu
*Director of the United States Patent and Trademark Office*